United States Patent [19]

Knott et al.

[11] Patent Number: 5,091,262

[45] Date of Patent: Feb. 25, 1992

[54] STARCH FILLED COEXTRUDED DEGRADABLE POLYETHYLENE FILM

[75] Inventors: Jack E. Knott, Barrington, Ill.; Paul D. Gage, Eau Claire, Wis.

[73] Assignee: Rexene Products Company, Dallas, Tex.

[21] Appl. No.: 572,402

[22] Filed: Aug. 27, 1990

[51] Int. Cl.$^5$ .................. B32B 27/18; B32B 27/32
[52] U.S. Cl. ................... 428/516; 428/213; 428/220; 428/500; 428/515; 428/523
[58] Field of Search ............... 428/500, 213, 515, 516, 428/523, 220

[56] References Cited

U.S. PATENT DOCUMENTS

| | | | |
|---|---|---|---|
| 3,454,510 | 7/1969 | Newland et al. | 260/23 |
| 3,797,690 | 3/1974 | Taylor et al. | 220/1 R |
| 3,850,862 | 11/1974 | Clendinning et al. | 260/7.5 |
| 3,850,863 | 11/1974 | Clendinning et al. | 260/7.5 |
| 3,907,729 | 9/1975 | Tomiyama | 260/17 R |
| 3,931,068 | 1/1976 | Clendinning et al. | 260/7.5 |
| 3,932,319 | 1/1976 | Clendinning et al. | 260/7.5 |
| 3,940,145 | 4/1976 | Otey et al. | 428/423 |
| 3,952,347 | 4/1976 | Comerford et al. | 5/335 |
| 4,009,313 | 2/1977 | Crawford et al. | 428/290 |
| 4,016,117 | 4/1977 | Griffin | 260/17.4 ST |
| 4,021,388 | 5/1977 | Griffin | 260/13 |
| 4,026,849 | 5/1977 | Bagley et al. | 260/17.4 GC |
| 4,125,495 | 11/1978 | Griffin | 260/17.4 ST |
| 4,133,784 | 1/1979 | Otey et al. | 260/17.4 ST |
| 4,218,350 | 8/1980 | Griffin | 260/17.4 ST |
| 4,324,709 | 4/1982 | Griffin | 523/210 |
| 4,337,181 | 6/1982 | Otey et al. | 523/128 |
| 4,503,098 | 3/1985 | Potts | 427/394 |
| 4,673,438 | 6/1987 | Wittwer et al. | 106/126 |
| 4,839,450 | 6/1989 | Fanta et al. | 527/313 |
| 4,873,270 | 10/1989 | Aime et al. | 523/128 |

FOREIGN PATENT DOCUMENTS

| | | |
|---|---|---|
| 0282451 | 3/1988 | European Pat. Off. . |
| 0298920 | 7/1988 | European Pat. Off. . |
| 0304401 | 8/1988 | European Pat. Off. . |
| 0326517 | 1/1989 | European Pat. Off. . |
| 0327505 | 3/1989 | European Pat. Off. . |
| 2190093 | 5/1987 | United Kingdom . |

Primary Examiner—Merrell C. Cashion, Jr.
Assistant Examiner—D. S. Nakarani
Attorney, Agent, or Firm—Harold E. Meier

[57] ABSTRACT

A starch filled, coextruded degradable polyethylene film includes a starch filled inner layer positioned between two outer layers that contain a prodegradant. The outer layers of the film, which contain no starch, enable the film to retain desirable physical properties similar to conventional polyethylene film. The prodegradant causes the outer layers of the film to degrade under appropriate conditions exposing the starch filled inner layer. The starch in the inner layer then serves as a source of nutrients for microorganisms which consume starch, leaving a porous structure that is vulnerable to oxidation, hydrolysis, direct enzyme action or combinations of these processes.

17 Claims, No Drawings

STARCH FILLED COEXTRUDED DEGRADABLE POLYETHYLENE FILM

TECHNICAL FIELD

This invention relates to a starch filled coextruded degradable film.

BACKGROUND OF THE INVENTION

Polyethylene films are used in a wide variety of applications including stretch/cling (pallet wraps etc.), grocery bags, heavy duty shipping sacks, disposable diapers, food wraps and agricultural films. Large volumes of polyethylene film are used in these applications on a daily basis. Decomposition of conventional polyethylene films, however, takes long periods of time under most conditions. Thus, a need has arisen for a degradable polyethylene film suitable for use in various products.

A degradable composition comprising a synthetic resin, a degradable granular filler such as natural starch granules and a substance autoxidizable to yield a peroxide is described in U.S. Pat. No. 4,016,117 issued Apr. 5, 1977 to Griffin. Purportedly, articles formed from the composition described in this patent degrade as the starch granules exposed at or adjacent the surface of the article are degraded and leached away followed successively by degradation of particles at the interior to produce a cellular structure which is more readily attacked by the processes of oxidation, hydrolysis, direct enzyme action or combinations of these processes.

The use of starch as a filler material in the production of thin polyethylene films, however, causes major problems in the manufacturing process. Starch, a hydrophilic material is incompatible with polyethylene, a hydrophobic material. Due to the relative incompatibility of starch with polyethylene and the difference in the surface energies of the respective materials, starch migrates to the surface of the meltstream during the extrusion process and collects on the die lips where the shear rates are significant. The starch deposited on the die lips oxidizes and intermittently picks off into the passing film material causing holes and defects in the film product.

The use of starch as filler material in polyethylene film products also has a significant impact on the physical properties of the film product. Major reductions in gloss, elongation, toughness, tear strength, impact and coefficient of friction result from the use of starch as a filler material. Although the magnitude of the changes in physical properties varies with different types of polyethylene, e.g., low density polyethylene (LDPE) vs. linear low density polyethylene (LLDPE), the changes are nonetheless significantly deleterious.

Thus, there is a need for a polyethylene film that is degradable and which simultaneously substantially retains the desirable properties of conventional polyethylene film.

SUMMARY OF THE INVENTION

The present invention provides a starch filled coextruded multilayer degradable polyethylene film. A starch filled inner layer is positioned between two outer layers that contain a prodegradant. The starch filled inner layer provides a source of nutrients for microorganisms. The outer layers of the film, which contain no starch, enable the film to retain the desired physical properties, similar to conventional polyethylene film. When the film is disposed of the prodegradant causes the outer layers of the film to degrade exposing the starch filled inner layer. The starch in the inner layer then may act as a source of nutrients for microorganisms which consume the starch leaving a porous structure that is vulnerable to oxidation, hydrolysis, direct enzyme action or combinations of these processes.

DETAILED DESCRIPTION OF THE INVENTION

The film of the present invention is a multilayer polyethylene film produced with conventional coextrusion processes. The term "polyethylene" as used herein refers to low, medium and high density polyethylenes, and mixtures thereof, including low density polyethylene (LDPE), linear low density polyethylene (LLDPE), ultra low density polyethylene (ULDPE), ethylene copolymers and mixtures of polyethylene and other polymers suitable for the manufacture of films and sheets.

The inner layer of the film of the present invention contains from about 3% to about 40% starch. All percentages used herein are by weight unless otherwise indicated. Starches are polysaccharide compounds which are converted to sugar upon hydrolysis. The term "starch" as used herein refers to any starch obtained from cereal grains or root crops such as corn, maize, wheat, rice and potatoes, other starches, starch components, modified starch products and mixtures thereof. Starch is a hydrophilic material, having a strong tendency to bind or absorb water. Polyethylene, on the other hand, is a hydrophobic material, basically antagonistic to water. Consequently, polyethylene and starch are basically incompatible and the inclusion of starch granules in a polyethylene film results in a film having less desirable properties than conventional polyethylene film. In order to compensate for the change in physical properties, the present invention provides two starch free outer layers, each comprising from about 5% to about 20% of the total film thickness. Preferably, each outer layer comprises about 10% of the total film thickness.

Since the starch-free outer layers of the film prevent the exposure of the starch contained in the inner layer, the film would not normally degrade through attack on the starch. The present invention, however, provides a prodegradant in the outer layers to facilitate the degradation of the outer layers resulting in the exposure of the starch filled inner layer. The functional components of the prodegradant are: (1) a transition metal such as manganese or iron and salts thereof; and, (2) a quantity of an unsaturated polymer such as vegetable oils, fats, fatty acids, styrene-butadiene-styrene block copolymer or other unsaturated polymers of a wide variety. Although the specific reaction kinetics and dynamics are not well understood, it appears that the transition metal or transition metal salt reacts initially with the unsaturated polymer or fatty acid source at the surface of the film to produce peroxides and hydroperoxides in the initial phase of the reaction. The peroxides and hydroperoxides then initiate free radical chain reactions and ultimate oxidation of the polyethylene film. Thus, the outer layers of the film of the present invention degrade through oxidation and expose the starch filled inner layer. The starch filled inner layer may also contain prodegradant in order to increase the rate of degradation.

Preferably the outer layers of the film of the present invention contain from about 5% to about 15% of a commercially available prodegradant system sold by Archer Daniels Midland Co., Decatur, Ill. 62525 under the trade designations ADM 012401 and ADM 012406. ADM 012401 is a metal catalyst concentrate containing approximately 7200 ppm manganese in a linear low density polyethylene base having a density of approximately 0.918 gm/cm$^3$ and a melt index of about 2.0. ADM 012406 is 50% styrene-butadiene-styrene unsaturated block copolymer and 50% linear low density polyethylene having a density of about 0.924 and a melt index of about 20.0. The styrene-butadiene-styrene copolymer contains about 70% butadiene. The ratio of ADM 012406 to ADM 12401 is preferably about 4:1. More preferably, the outer layers of the film contain about 10% of the prodegradant system.

The films of the present invention may be produced in thickness from about 0.75 mils to about 7.0 mils using conventional cast and blown film coextrusion techniques.

Preferably, the film is produced in thickness from between about 1.0 mil to about 2.0 mils.

The invention will be further described with respect to the following examples; however, the scope of the invention is not to be limited thereby.

EXAMPLE 1

In order to illustrate the effect of incorporating starch in a polyethylene film, films were produced from a low density polyethylene resin and from a linear low density polyethylene resin in a conventional blown film extrusion process. Each resin was used to produce a conventional and a starch filled film. A commercially available starch master batch sold by Ampacet Corp., 250 S. Terrace Ave., Mount Vernon, NY 10550 under the trade designation Ampacet 20835 was added to the resins used to produce the starch filled films at a rate resulting in a starch concentration in the films of 6% by weight. Ampacet 20835 is a linear low density polyethylene having a density of about 0.924 gm/cm$^3$ and a melt index of about 20.0 that contains 40% starch, 14% unsaturated styrene-butadiene-styrene block copolymer and about 500 ppm manganese. The films were tested and the results are set forth in Table 1 below.

TABLE 1
Effect of Starch on Film Properties

| PROPERTY | LDPE | LDPE +6% STARCH | LLDPE | LLDPE +6% STARCH |
|---|---|---|---|---|
| AV. GAUGE (μm) | 50 | 50 | 34 | 45 |
| GLOSS (%) | 70 | 25.7 | 67 | 25 |
| TENSILES: | | | | |
| Elong. MD (%) | 400 | 160 | 615 | 585 |
| Elong. TD (%) | 650 | 615 | 705 | 660 |
| Stress MD (kPa) | 24115 | 16363 | 30660 | 17225 |
| Stress TD (kPa) | 22392 | 11747 | 26660 | 16536 |
| C.O.F. | 0.60 | 0.39 | 1.0 | 0.53 |
| TEAR | | | | |
| MD (g/mm) | 3740 | 2559 | 6693 | 5315 |
| TD (g/mm) | 10236 | 9449 | 13779 | 13385 |
| IMPACT (g/mm) | 3740 | 1260 | 7480 | 5905 |

The foregoing example illustrates the deleterious effects on the physical properties of films resulting from the addition of starch.

EXAMPLES 2-16

Coextruded polyethylene films were produced using conventional cast film techniques. The films were cast with a starch filled center layer and exterior layers containing varying concentrations of prodegradant. The following commercially available materials were used to produce the films: DOWLEX 2047A—LLDPE/octene copolymer having a melt index of about 2.3 and a density of about 0.917 g/cm$^3$; DOWLEX 2027A—a LLDPE/octene copolymer having a melt index of 4.0 and a density of 0.941 g/cm$^3$; Rexene 1031S—a low density polyethylene homopolymer having a melt index of 0.80 and a density of 0.924 g/cm$^3$; Rexene 1068—a low density polyethylene homopolymer having a melt index of about 5.5 and a density of about 0.922 g/cm$^3$; Quantum CM80707—a white color concentrate containing about 50% titanium dioxide in a low density polyethylene base; Ampacet 20835—a starch filled polyethylene aster batch; and, ADM 012401 with ADM 012406—a transition metal salt/unsaturated polymer prodegradant system. The compositions of the core and exterior layers of the film are set forth in Table 2 below.

TABLE 2

| Example | Dowlex 2047A | Dowlex 2027A | Rexene 1031S | Rexene 1068 | Ampacet 20835 | ADM 012406/ 012401 | CM 80707 |
|---|---|---|---|---|---|---|---|
| 2 | | | | | | | |
| core- | 40% | | 53% | | | | 7% |
| exterior | | 65% | | 35% | | | |
| 3, 4 | | | | | | | |
| core- | 40% | | 45.5% | | 7.5% | | 7% |
| exterior | | 65% | | 35% | | | |
| 5, 6 | | | | | | | |
| core- | 40% | | 45.5% | | 7.5% | | 7% |
| exterior | | 60% | | 30% | | 8%/2% | |
| 7, 8 | | | | | | | |
| core- | 40% | | 30.5% | | 22.5% | | 7% |
| exterior | | 65% | | 35% | | | |
| 9, 10 | | | | | | | |
| core- | 40% | | 30.5% | | 22.5% | | 7% |
| exterior | | 60% | | 30% | | 8%/2% | |
| 11, 12 | | | | | | | |
| core- | 40% | | 38% | | 15% | | 7% |
| exterior | | 62.5% | | 32.5% | | 4%/1% | |
| 13 | | | | | | | |
| core- | 40% | | 38% | | 15% | | 7% |
| exterior | | 65% | | 35% | | | |

TABLE 2-continued

| Example | Dowlex 2047A | Dowlex 2027A | Rexene 1031S | Rexene 1068 | Ampacet 20835 | ADM 012406/ 012401 | CM 80707 |
|---|---|---|---|---|---|---|---|
| 14 | | | | | | | |
| core- | 40% | | 45.5% | | 7.5% | | 7% |
| exterior | | 62.5% | | 32.5% | | 4%/1% | |
| 15 | | | | | | | |
| core- | 40% | | 38% | | 15% | | 7% |
| exterior | | 60% | | 30% | | 8%/2% | |
| 16 | | | | | | | |
| core- | 40% | | 30.5% | | 22.5% | | 7% |
| exterior | | 62.5% | | 32.5% | | 4%/1% | |

In order to test the degradability of the films of Examples 2-16, the films were aged at approximately 160° F. For 24 days at a relative humidity of approximately 50%. The physical properties of the films were tested prior to aging and at 8-day intervals during the aging process. The results of the tests are set forth in Tables 3-6 below.

TABLE 3

| | | | | | Film Properties Prior to Aging | | | | |
|---|---|---|---|---|---|---|---|---|---|
| Example | ASTM | | 2 | 3 | 4 | 5 | 6 | 7 | 8 | 9 |
| Density (gms/cm$^3$) | | | 0.935 | 0.937 | 0.935 | 0.940 | 0.935 | 0.965 | 0.936 | 0.965 |
| Gauge (mils) | | | 1.24 | 1.35 | 1.30 | 1.30 | 1.34 | 1.39 | 1.36 | 1.31 |
| Stress at: | D-882 | | | | | | | | | |
| 5% Elongation | MD | | 290 | 299 | 320 | 299 | 286 | 293 | 317 | 339 |
| (gms) | TD | | 271 | 273 | 287 | 302 | 264 | 294 | 296 | 295 |
| 10% Elongation | MD | | 589 | 612 | 638 | 612 | 581 | 572 | 637 | 659 |
| (gms) | TD | | 509 | 566 | 568 | 584 | 522 | 561 | 554 | 540 |
| 25% Elongation | MD | | 796 | 824 | 850 | 824 | 789 | 747 | 846 | 858 |
| (gms) | TD | | 586 | 663 | 666 | 688 | 614 | 651 | 641 | 629 |
| 40% Elongation | MD | | 1037 | 1023 | 1073 | 1023 | 1000 | 902 | 1029 | 1031 |
| (gms) | TD | | 617 | 692 | 691 | 719 | 644 | 685 | 656 | 640 |
| Ultimate | MD | D-882 | 2180 | 2006 | 1955 | 1898 | 1868 | 1461 | 1727 | 1461 |
| Stress (gms) | TD | | 1644 | 1387 | 1472 | 1379 | 1327 | 1443 | 1327 | 1269 |
| Ultimate | MD | D-882 | 350 | 308 | 271 | 306 | 279 | 315 | 335 | 315 |
| Elongation (%) | TD | | 755 | 603 | 657 | 607 | 634 | 666 | 660 | 619 |
| Tear | MD | D-1922 | 26 | 20 | 29 | 21 | 20 | 23 | 27 | 20 |
| Strength (gms) | TD | | 202 | 265 | 279 | 270 | 283 | 322 | 263 | 232 |
| Impact | MD | D-1709 | 64 | 70 | 53 | 65 | <45 | <45 | <45 | <45 |
| Coefficient of (1) | | | 1.08 | 0.96 | 0.96 | 1.02 | 1.23 | 0.83 | 0.83 | 0.86 |
| Friction (2) | | | 0.57 | 0.59 | 0.53 | 0.64 | 0.62 | 0.50 | 0.53 | 0.50 |

| Example | ASTM | 10 | 11 | 12 | 13 | 14 | 15 | 16 |
|---|---|---|---|---|---|---|---|---|
| Density (gms/cm$^3$) | | 0.936 | 0.960 | 0.961 | 0.952 | 0.940 | 0.956 | 0.959 |
| Gauge (mils) | | 1.36 | 1.30 | 1.15 | 1.29 | 1.29 | 1.31 | 1.32 |
| Stress at: | D-882 | | | | | | | |
| 5% Elongation MD | | 317 | 330 | 236 | 298 | 269 | 313 | 342 |
| (gms) TD | | 277 | 309 | 227 | 273 | 305 | 309 | 342 |
| 10% Elongation MD | | 637 | 633 | 531 | 595 | 531 | 618 | 660 |
| (gms) TD | | 555 | 574 | 435 | 538 | 589 | 632 | 637 |
| 25% Elongation MD | | 846 | 830 | 739 | 788 | 700 | 805 | 859 |
| (gms) TD | | 650 | 666 | 511 | 628 | 687 | 746 | 749 |
| 40% Elongation MD | | 1029 | 1015 | 938 | 969 | 874 | 770 | 1033 |
| (gms) TD | | 667 | 692 | 534 | 649 | 689 | 770 | 776 |
| Ultimate MD | D-882 | 1479 | 1666 | 2180 | 1716 | 1734 | 1716 | 1730 |
| Stress (gms) TD | | 1447 | 1110 | 1139 | 1110 | 1505 | 1681 | 1423 |
| Ultimate MD | D-882 | 317 | 300 | 350 | 335 | 341 | 335 | 308 |
| Elongation (%) TD | | 681 | 531 | 648 | 557 | 638 | 691 | 622 |
| Tear MD | D-1922 | 53 | 25 | 19 | 21 | 29 | 41 | 28 |
| Strength (gms) TD | | 281 | 279 | 311 | 285 | 219 | 318 | 271 |
| Impact MD | D-1709 | 53 | 50 | <45 | 55 | 69 | 56 | <45 |
| Coefficient of (1) | | 1.14 | 0.89 | 1.06 | 0.93 | 0.86 | 1.01 | 0.84 |
| Friction[1] (2) | | 0.55 | 0.54 | 0.55 | 0.56 | 0.62 | 0.57 | 0.50 |

[1]Subsequent to extrusion, the film was passed between a polished chrome roller and a rubber-faced roller.
(1) refers to the side corresponding to the polished chrome roller and
(2) refers to the side corresponding to the rubber-faced roller.

TABLE 4

| | | Film Properties After Eight Days | | | | | | | |
|---|---|---|---|---|---|---|---|---|---|
| Example | ASTM | 2 | 3 | 4 | 5 | 6 | 7 | 8 | 9 |
| 5% Elongation MD | | 290 | 437 | 429 | 393 | 407 | 426 | 399 | 605 |
| (gms) TD | | 427 | 431 | 471 | 420 | 405 | 472 | 461 | 581 |
| 10% Elongation MD | | 589 | 764 | 756 | 688 | 700 | 724 | 704 | 922 |
| (gms) TD | | 694 | 706 | 803 | 689 | 667 | 752 | 747 | 890 |
| 25% Elongation MD | | 736 | 994 | 990 | 909 | 917 | 903 | 894 | 1050 |
| (gms) TD | | 753 | 775 | 866 | 760 | 720 | 793 | 795 | 853 |

TABLE 4-continued

Film Properties After Eight Days

| | | | | | | | | | | |
|---|---|---|---|---|---|---|---|---|---|---|
| 40% Elongation | MD | | 1037 | 1215 | 1220 | 1112 | 1143 | 1047 | 1041 | 1156 |
| (gms) | TD | | 763 | 779 | 891 | 768 | 715 | 757 | 759 | 806 |
| Ultimate | MD | D-882 | 2180 | 1859 | 1824 | 1707 | 1724 | 1488 | 1460 | 1421 |
| Stress (gms) | TD | | 1639 | 1200 | 1699 | 1443 | 1520 | 1363 | 1481 | 1116 |
| Ultimate | MD | D-882 | 350 | 234 | 205 | 254 | 229 | 270 | 270 | 244 |
| Elongation (%) | TD | | 720 | 553 | 662 | 649 | 692 | 622 | 655 | 516 |
| Tear | MD | D-1922 | 26 | 28 | 33 | 16 | 12 | 23 | 24 | 45 |
| Strength (gms) | TD | | 275 | 273 | 295 | 390 | 283 | 330 | 357 | 383 |
| Impact | MD | D-1709 | — | — | — | — | — | — | — | — |

| Example | | ASTM | 10 | 11 | 12 | 13 | 14 | 15 | 16 |
|---|---|---|---|---|---|---|---|---|---|
| 5% Elongation | MD | | 579 | 408 | 308 | 414 | 395 | 520 | 506 |
| (gms) | TD | | 528 | 426 | 323 | 465 | 461 | 454 | 527 |
| 10% Elongation | MD | | 886 | 698 | 550 | 702 | 690 | 830 | 895 |
| (gms) | TD | | 822 | 688 | 547 | 742 | 775 | 732 | 815 |
| 25% Elongation | MD | | 1011 | 889 | 744 | 899 | 889 | 997 | 1071 |
| (gms) | TD | | 823 | 747 | 597 | 780 | 859 | 773 | 814 |
| 40% Elongation | MD | | 1119 | 1058 | 936 | 1059 | 1076 | 1156 | 1207 |
| (gms) | TD | | 797 | 745 | 589 | 748 | 862 | 745 | 758 |
| Ultimate | MD | D-882 | 1341 | 1550 | 1352 | 1549 | 1701 | 1561 | 1583 |
| Stress (gms) | TD | | 881 | 1274 | 1110 | 1274 | 1300 | 1332 | 1443 |
| Ultimate | MD | D-882 | 202 | 260 | 204 | 278 | 263 | 240 | 257 |
| Elongation (%) | TD | | 417 | 573 | 627 | 573 | 548 | 643 | 642 |
| Tear | MD | D-1922 | 12 | 25 | 14 | 37 | 16 | 20 | 24 |
| Strength (gms) | TD | | 342 | 336 | 413 | 302 | 289 | 338 | 359 |
| Impact | MD | D-1709 | — | — | — | — | — | — | — |

TABLE 5

Film Properties After Sixteen Days

| Example | | ASTM | 2 | 3 | 4 | 5 | 6 | 7 | 8 | 9 |
|---|---|---|---|---|---|---|---|---|---|---|
| 5% Elongation | MD | | 419 | 458 | 423 | 715 | 635 | 516 | 496 | — |
| (gms) | TD | | 446 | 438 | 470 | 618 | 618 | 595 | 592 | — |
| 10% Elongation | MD | | 746 | 782 | 707 | 1073 | 980 | 814 | 829 | — |
| (gms) | TD | | 722 | 728 | 737 | 875 | 935 | 905 | 910 | — |
| 25% Elongation | MD | | 989 | 1018 | 922 | 1215 | 1137 | 977 | 1000 | — |
| (gms) | TD | | 795 | 796 | 792 | 963 | — | 939 | 943 | — |
| 40% Elongation | MD | | 1216 | 1228 | 1124 | 1333 | 1295 | 1119 | 1123 | — |
| (gms) | TD | | 799 | 793 | 789 | — | — | 891 | 881 | — |
| Ultimate | MD | D-882 | 2154 | 1879 | 1711 | 1609 | 1629 | 1494 | 1534 | 798 |
| Stress (gms) | TD | | 1707 | 1463 | 1357 | 907 | 972 | 1322 | 1478 | 575 |
| Ultimate | MD | D-882 | 327 | 235 | 221 | 97 | 117 | 275 | 282 | 3 |
| Elongation (%) | TD | | 744 | 660 | 627 | 24 | 20 | 572 | 630 | 4 |
| Tear | MD | D-1922 | 22 | 47 | 2 | 8 | 12 | 54 | 47 | <16 |
| Strength (gms) | TD | | 305 | 300 | 291 | 74 | 60 | 364 | 384 | <16 |
| Impact[2] | MD | D-1709 | 50 | <45 | <45 | <45 | <45 | <45 | <45 | <45 |

| Example | | ASTM | 10 | 11 | 12 | 13 | 14 | 15 | 16 |
|---|---|---|---|---|---|---|---|---|---|
| 5% Elongation | MD | | 831 | 408 | 492 | 414 | 458 | 806 | 732 |
| (gms) | TD | | — | 573 | 545 | 437 | 504 | 583 | 642 |
| 10% Elongation | MD | | — | 698 | 755 | 702 | 779 | 1146 | 1061 |
| (gms) | TD | | — | 846 | 790 | 682 | 803 | — | 747 |
| 25% Elongation | MD | | — | 889 | 888 | 899 | 987 | — | 1148 |
| (gms) | TD | | — | 847 | 733 | 737 | 861 | — | — |
| 40% Elongation | MD | | — | 1058 | 1000 | 1059 | 1175 | — | 1221 |
| (gms) | TD | | — | 711 | — | 729 | 851 | — | — |
| Ultimate | MD | D-882 | 855 | 1550 | 1222 | 1549 | 1727 | 1198 | 1172 |
| Stress (gms) | TD | | 488 | 889 | 822 | 1087 | 1252 | 733 | 962 |
| Ultimate | MD | D-882 | 5 | 260 | 103 | 278 | 236 | 18 | 41 |
| Elongation (%) | TD | | 3 | 53 | 37 | 550 | 559 | 5 | 11 |
| Tear | MD | D-1922 | <16 | 12 | 5 | 21 | 17 | <16 | <16 |
| Strength (gms) | TD | | <16 | 216 | 37 | 314 | 294 | <16 | 40 |
| Impact[3] | MD | D-1709 | <45 | <45 | <45 | <45 | 48 | <45 | <45 |

[2]Tested at 12 days.
[3]Tested at 12 days.

TABLE 6

Film Properties After 24 Days

| Example | | ASTM | 2 | 3 | 4 | 5 | 6 | 7 | 8 | 9 |
|---|---|---|---|---|---|---|---|---|---|---|
| 5% Elongation | MD | | 256 | 418 | 377 | —[4] | 651 | 516 | 458 | —[4] |
| (gms) | TD | | 390 | 377 | 402 | — | 602 | 437 | 502 | — |
| 10% Elongation | MD | | 685 | 794 | 709 | — | 1073 | 915 | 850 | — |
| (gms) | TD | | 716 | 705 | 732 | — | 864 | 749 | 831 | — |
| 25% Elongation | MD | | 935 | 1041 | 938 | — | 1232 | 1103 | 1042 | — |
| (gms) | TD | | 810 | 788 | 808 | — | — | 791 | 867 | — |
| 40% Elongation | MD | | 1158 | 1248 | 1133 | — | — | 1236 | 1169 | — |

TABLE 6-continued

| | | | Film Properties After 24 Days | | | | | | | |
|---|---|---|---|---|---|---|---|---|---|---|
| (gms) | TD | | 809 | 788 | 800 | — | — | 748 | 831 | — |
| Ultimate | MD | D-882 | 1890 | 1933 | 1733 | — | 1189 | 1614 | 1493 | — |
| Stress (gms) | TD | | 1882 | 1309 | 1453 | — | 914 | 1221 | 1040 | — |
| Ultimate | MD | D-882 | 273 | 257 | 225 | — | 22 | 214 | 206 | — |
| Elongation (%) | TD | | 785 | 595 | 653 | — | 8 | 618 | 410 | — |
| Tear | MD | D-1922 | 30 | 55 | 33 | — | <16 | 38 | 31 | <16 |
| Strength (gms) | TD | | 374 | 363 | 324 | — | <16 | 434 | 436 | <16 |
| Impact | MD | D-1709 | 45 | 50 | <45 | — | <45 | <45 | <45 | — |

| Example | | ASTM | 10 | 11 | 12 | 13 | 14 | 15 | 16 |
|---|---|---|---|---|---|---|---|---|---|
| 5% Elongation | MD | | —[4] | 642 | 562 | 398 | 519 | — | 918 |
| (gms) | TD | | — | 697 | 550 | 420 | 533 | 334 | 161 |
| 10% Elongation | MD | | — | 1018 | 903 | 776 | 907 | — | — |
| (gms) | TD | | — | 554 | — | 733 | 892 | — | — |
| 25% Elongation | MD | | — | — | — | 1005 | 1085 | — | — |
| (gms) | TD | | — | — | — | 798 | 923 | — | — |
| 40% Elongation | MD | | — | — | — | 1170 | 1216 | — | — |
| (gms) | TD | | — | — | — | 780 | 823 | — | — |
| Ultimate | MD | D-882 | — | 1069 | 980 | 1724 | 1582 | 406 | 952 |
| Stress (gms) | TD | | — | 987 | 720 | 1115 | 959 | 535 | 987 |
| Ultimate | MD | D-882 | — | 14 | 18 | 285 | 167 | 3 | 5 |
| Elongation (%) | TD | | — | 8 | 6 | 547 | 105 | 6 | 8 |
| Tear | MD | D-1922 | — | 8 | <16 | 17 | 45 | <16 | <16 |
| Strength (gms) | TD | | — | 12 | <16 | 417 | 353 | <16 | <16 |
| Impact | MD | D-1709 | — | <45 | <45 | <45 | <45 | <45 | <45 |

[4] Film crumbled at touch.

As can be seen from the foregoing examples, the films of the present invention provide a combination of initially satisfactory physical properties with subsequent degradability.

While the particular embodiments of the present invention have been described, it will be apparent to those skilled in the art that various changes and modifications can be made without departing from the spirit and scope of the invention. The following claims are intended to cover all such modifications that are within the scope of this invention.

I claim:

1. A multilayer film comprising:
   a center layer coextruded with adjacent exterior layers, the center layer comprising a mixture of polyethylene and starch, the exterior layers comprising a mixture of polyethylene and at least one prodegradant.

2. The film of claim 1 wherein said center layer comprises from about 3% to about 40% starch.

3. The film of claim 1 wherein the starch is selected from the group consisting of corn, maize, wheat, rice and potato starch, starch components, modified starch products, and mixtures thereof.

4. The film of claim 1 wherein the prodegradant is selected from the group consisting of transition metals, transition metal compounds, unsaturated polymers and mixtures thereof.

5. The film of claim 1 wherein the prodegradant is selected from the group consisting of manganese, manganese salts, iron, iron salts, vegetable oils, fats, fatty acids, unsaturated block copolymers and mixtures thereof.

6. The film of claim 1 wherein each exterior layer comprises from about 5% to about 20% of the total film thickness.

7. The film of claim 1 wherein each exterior layer comprises about 10% of the total film thickness.

8. The film of claim 1 wherein said film is from about 0.75 miles to about 7 miles in thickness.

9. A multilayer film comprising:
   a center layer coextruded with adjacent exterior layers, the center layer comprising a mixture of from about 60% to about 97% polyethylene and from about 3% to about 40% starch, the exterior layers comprising a mixture of polyethylene and at least one prodegradant.

10. The film of claim 9 wherein the starch is selected from the group consisting of corn, maize, wheat, rice and potato starch, starch components, modified starch products, and mixtures thereof.

11. The film of claim 9 wherein the prodegradant is selected from the group consisting of transition metals, transition metal compounds, unsaturated polymers and mixtures thereof.

12. The film of claim 9 wherein the prodegradant is selected from the group consisting of manganese, manganese salts, iron, iron salts, vegetable oils, fats, fatty acids, unsaturated block copolymers and mixtures thereof.

13. The film of claim 9 wherein each exterior layer comprises from about 5% to about 20% of the total film thickness.

14. The film of claim 9 wherein each exterior layer comprises about 10% of the total film thickness.

15. The film of claim 9 wherein said film is from about 0.75 mils to about 7 miles in thickness.

16. A multilayer film having a thickness from about 0.75 miles to about 7 miles, said film comprising:
   a center layer coextruded with adjacent exterior layers, the center layer comprising a mixture of from about 60% to about 97% polyethylene and from about 3% to about 40% of a starch selected from the group consisting of corn, maize, wheat, rice and potato starch, starch components, modified starch products, and mixtures thereof;
   the exterior layers comprising a mixture of polyethylene and about 5% to about 15% of at least one prodegradant selected from the group consisting of transition metals, transition metal compounds, unsaturated polymers and mixtures thereof, each of the exterior layers comprising from about 55 to about 20% of the total film thickness.

17. The film of claim 16 wherein the prodegradant is selected from the group consisting of manganese, manganese salts, iron, iron salts, vegetable oils, fats, fatty acids, unsaturated block copolymers and mixtures thereof.

* * * * *

UNITED STATES PATENT AND TRADEMARK OFFICE
CERTIFICATE OF CORRECTION

PATENT NO. : 5,091,262
DATED : February 25, 1992
INVENTOR(S) : Jack E. Knott, et al.

It is certified that error appears in the above-identified patent and that said Letters Patent is hereby corrected as shown below:

Col. 9, line 64, change "miles" to --mils--, both occurrences;
Col. 10, line 47, change "miles" to --mils--;
Col. 10, line 49, change "miles" to --mils--, both occurrences;
Col. 10, line 62, change "55" to --5%--.

Signed and Sealed this

Fifteenth Day of June, 1993

Attest:

MICHAEL K. KIRK

Attesting Officer

Acting Commissioner of Patents and Trademarks